(12) United States Patent
Takenaka et al.

(10) Patent No.: US 10,787,065 B2
(45) Date of Patent: Sep. 29, 2020

(54) VEHICULAR OPENING/CLOSING BODY CONTROL DEVICE AND MOTOR CONTROL DEVICE

(71) Applicant: AISIN SEIKI KABUSHIKI KAISHA, Kariya-shi (JP)

(72) Inventors: Tomoyuki Takenaka, Kariya (JP); Kohei Kobayashi, Ichinomiya (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 280 days.

(21) Appl. No.: 15/926,243

(22) Filed: Mar. 20, 2018

(65) Prior Publication Data

US 2018/0272845 A1 Sep. 27, 2018

(30) Foreign Application Priority Data

Mar. 22, 2017 (JP) ................. 2017-055826

(51) Int. Cl.
| | |
|---|---|
| *B60J 5/06* | (2006.01) |
| *E05F 15/41* | (2015.01) |
| *E05F 15/643* | (2015.01) |
| *E05F 15/657* | (2015.01) |
| *H02P 6/24* | (2006.01) |
| *E05F 15/659* | (2015.01) |

(Continued)

(52) U.S. Cl.
CPC ............. *B60J 5/06* (2013.01); *E05F 15/41* (2015.01); *E05F 15/643* (2015.01); *E05F 15/657* (2015.01); *E05F 15/659* (2015.01); *H02P 3/22* (2013.01); *H02P 6/24* (2013.01); *E05Y 2400/334* (2013.01); *E05Y 2900/531* (2013.01); *H02P 6/20* (2013.01)

(58) Field of Classification Search
CPC .... H02P 29/032; H02P 29/40; H02P 2205/01; H02H 7/08; E06B 3/70; E06B 5/16; E06B 3/46; E05D 15/06
See application file for complete search history.

(56) References Cited

U.S. PATENT DOCUMENTS

| 4,996,469 A * | 2/1991 | DeLange ................. H02P 1/28 |
|---|---|---|
| | | 318/757 |
| 2008/0048598 A1* | 2/2008 | Shibuya ................. H02P 6/185 |
| | | 318/400.1 |

(Continued)

FOREIGN PATENT DOCUMENTS

| JP | 10-191682 | 7/1998 |
|---|---|---|
| JP | 2006-271127 | 10/2006 |

(Continued)

*Primary Examiner* — Eduardo Colon Santana
*Assistant Examiner* — Said Bouziane
(74) *Attorney, Agent, or Firm* — Oblon, McClelland, Maier & Neustadt, L.L.P.

(57) ABSTRACT

A vehicular opening/closing body control device includes a braking control unit configured to apply a braking force to an opening/closing body by supplying driving power having a locked conduction phase to a motor, which is a drive source of the opening/closing body, wherein, when an execution time of phase-locked conduction control for locking the conduction phase and supplying the driving power reaches or exceeds a predetermined time, the braking control unit switches a conduction phase used for the phase-locked conduction control.

4 Claims, 10 Drawing Sheets

(51) Int. Cl.
*H02P 3/22* (2006.01)
*H02P 6/20* (2016.01)

(56) References Cited

U.S. PATENT DOCUMENTS

2015/0137717 A1* 5/2015 Ishikawa .................. B25F 5/00
                                                      318/379
2016/0290028 A1* 10/2016 Ikeda ....................... G05B 9/02
2017/0081894 A1   3/2017 Kobayashi et al.
2018/0367070 A1* 12/2018 Ichikawa ................. B25F 5/00

FOREIGN PATENT DOCUMENTS

| JP | 2007-224659 | 9/2007 |
| JP | 2008-271698 | 11/2008 |
| JP | 2013-118782 | 6/2013 |
| JP | 2014-194151 | 10/2014 |
| JP | 2015-185606 | 10/2015 |
| JP | 2017-57690 | 3/2017 |

* cited by examiner

| TIME | T1 | T2 | T3 | T4 | T5 | ... |
|---|---|---|---|---|---|---|
| DETECTED VALUE OF SLIDE DOOR OPENING/CLOSING OPERATION POSITION (Xd) | X5 | X7 | X8 | X7 | X7 | ... |
| HOLD VALUE OF SLIDE DOOR OPENING /CLOSING OPERATION POSITION (Xd4) | X2 | X3 | X4 | X10 | X5 | ... |
| CHANGE IN SLIDE DOOR OPENING/ CLOSING OPERATION POSITION (\|Xd-Xd4\|) | 3cnt | 4cnt | 4cnt | 3cnt | 2cnt (STOP) | ... |

# VEHICULAR OPENING/CLOSING BODY CONTROL DEVICE AND MOTOR CONTROL DEVICE

CROSS REFERENCE TO RELATED APPLICATIONS

This application is based on and claims priority under 35 U.S.C. § 119 to Japanese Patent Application 2017-055826, filed on Mar. 22, 2017, the entire contents of which are incorporated herein by reference.

TECHNICAL FIELD

This disclosure relates to a vehicular opening/closing body control device and a motor control device.

BACKGROUND DISCUSSION

In the related art, there has been known a vehicular opening/closing body control device which applies a braking force to an opening/closing body (e.g., a slide door) such that a movement speed of the opening/closing body can be reduced or the opening/closing operation position of the opening/closing body can be maintained. For example, an opening/closing body control device described in JP 2014-194151 A (Reference 1) applies a braking force to a slide door by supplying driving power having a locked conduction phase to a motor, which is a drive source of the slide door. Thus, the opening/closing body control device is configured to suppress the movement speed of the slide door when the slide door, which has stopped in the middle of the opening/closing operation, moves due to the inclination of the road surface.

However, by performing such phase-locked conduction control (one-phase conduction control), a motor coil or a drive circuit switching element, which has the conduction phase, generates heat. Thus, there is a problem in that the duration of braking control, for which the braking force is applied to the opening/closing body, is limited. In this respect, there still remains a room for improvement.

Thus, a need exists for a vehicular opening/closing body control device and a motor control device, which are not susceptible to the drawback mentioned above.

SUMMARY

A vehicular opening/closing body control device according to an aspect of this disclosure includes a braking control unit configured to apply a braking force to an opening/closing body by supplying driving power having a locked conduction phase to a motor, which is a drive source of the opening/closing body. When an execution time of phase-locked conduction control for locking the conduction phase and supplying the driving power reaches or exceeds a predetermined time, the braking control unit switches a conduction phase used for the phase-locked conduction control.

A motor control device according to another aspect of this disclosure includes a braking control unit configured to generate a braking force in a motor by supplying driving power having a locked conduction phase to the motor, wherein, when an execution time of the phase-locked conduction control for locking the conduction phase and supplying the driving power reaches or exceeds a predetermined time, the braking control unit switches a conduction phase used for the phase-locked conduction control.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment in which a vehicular opening/closing body control device is embodied in a power slide door apparatus will be described with reference to the drawings.

Figure 1:
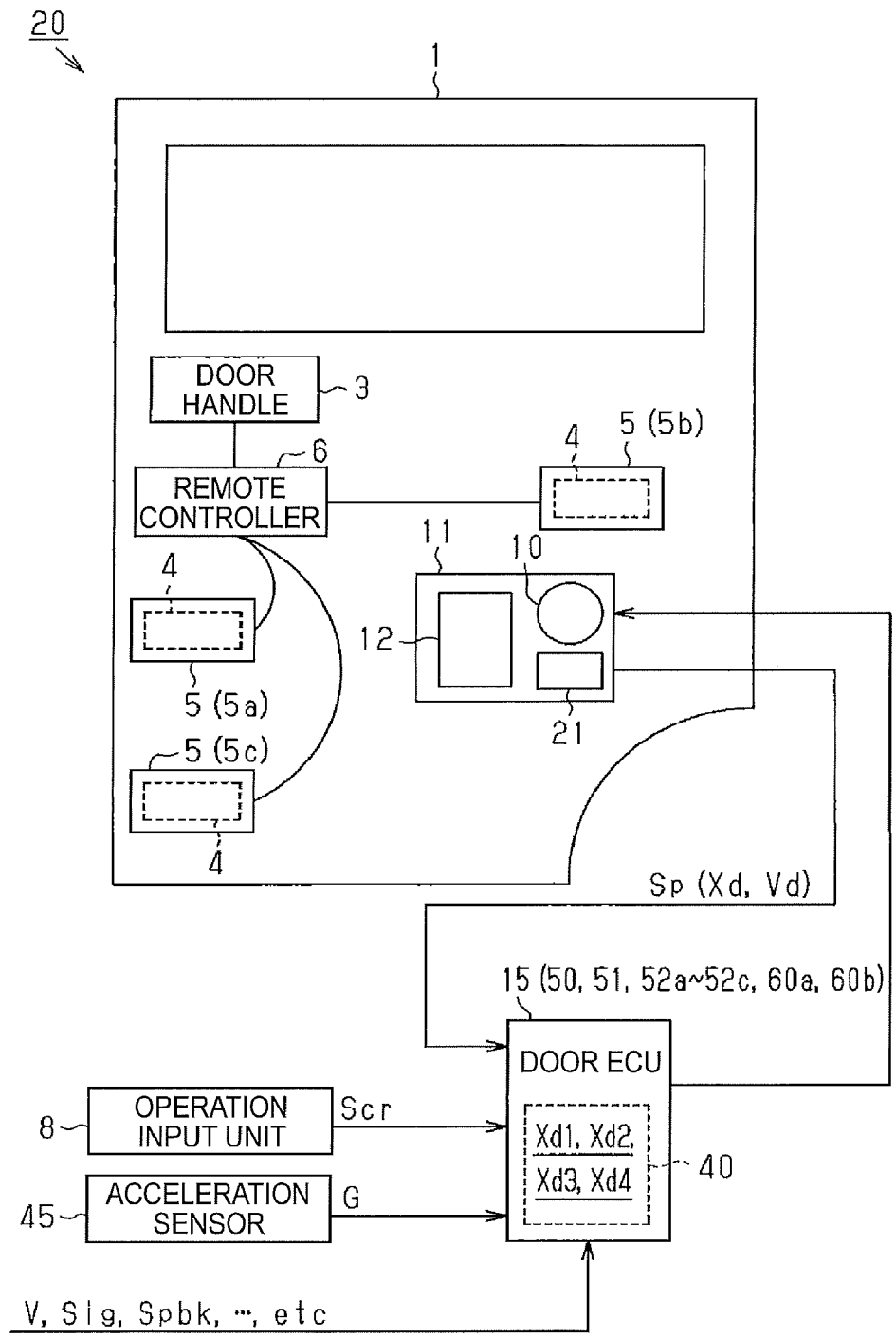
FIG. 1 is a view illustrating a schematic configuration of a power slide door apparatus.

As illustrated in FIG. 1, a slide door 1 is supported on a side surface of a vehicle (not illustrated) and moves in a longitudinal direction thereof to open/close a door opening provided in the side surface of the vehicle. Specifically, the slide door 1 is configured to become a fully-closed state where the slide door 1 closes the door opening by moving to the vehicle front side (the left side in FIG. 1) and to become a fully-opened state where an occupant may get in or out of the vehicle through the door opening by moving to the vehicle rear side (the right side in FIG. 1). In addition, the slide door 1 is provided with a door handle 3 for opening/closing the slide door 1.

In addition, the slide door 1 is provided with a plurality of lock devices 5 each having a latch mechanism 4, which is engaged with a striker (not illustrated) provided on the vehicle body side depending on the movement position of the slide door 1. Specifically, the slide door 1 is provided with a front lock 5a and a rear lock 5b, which serve as full-closing locks to hold the slide door 1 at the fully-closed position. Moreover, the slide door 1 is provided with a full-opening lock 5c for holding the slide door 1 at the fully-opened position. In addition, these locking devices 5 are connected to the door handle 3 via a remote controller 6.

That is, in the slide door 1 of the present embodiment, the engaged state of the latch mechanism 4 constituting each lock device 5 is released by operating the door handle (an outside door handle and an inside door handle) 3. In addition, it is possible to manually open/close the slide door using the door handle 3, which serves as a grip.

In addition, in the slide door 1 of the present embodiment, the engaged state of the latch mechanism 4 constituting the lock device 5 may be released even when a user operates an operation input unit 8, which is provided in the door handle 3, a vehicle room, a portable device, or the like. In addition, the slide door 1 of the present embodiment is provided with a door actuator 11, which opens/closes the slide door 1 using a motor 10 as a drive source.

Specifically, the door actuator 11 includes an opening/closing drive unit 12, which performs opening/closing driving of the slide door 1 via a drive cable (not illustrated). In addition, in the slide door 1 of the present embodiment, an operation of the door actuator 11 is controlled by a door ECU 15. Thus, the slide door 1 of the present embodiment is configured as a power slide door apparatus 20, which performs an opening/closing operation based on a driving force of the motor 10.

Specifically, the door ECU 15 of the present embodiment detects an operation request of the slide door 1, which is made by the user, based on an operation input signal Scr input from the operation input unit 8. In addition, the door actuator 11 of the present embodiment is provided with a pulse sensor 21, which outputs a pulse signal Sp synchronized with rotation of the motor 10. In addition, a brushless motor is used for the motor 10 of the present embodiment. Then, the door ECU 15 of the present embodiment detects an opening/closing operation position Xd and a movement speed Vd of the slide door 1 by counting the pulse signals Sp.

In addition, a vehicle state quantity such as a vehicle speed V, and control signals such as an ignition signal Sig and a parking brake signal Spbk are input to the door ECU 15 of the present embodiment. Then, the door ECU 15 of the present embodiment controls the operation of the slide door 1 based on various state quantities and control signals related to the slide door 1 and the vehicle.

Figure 2:
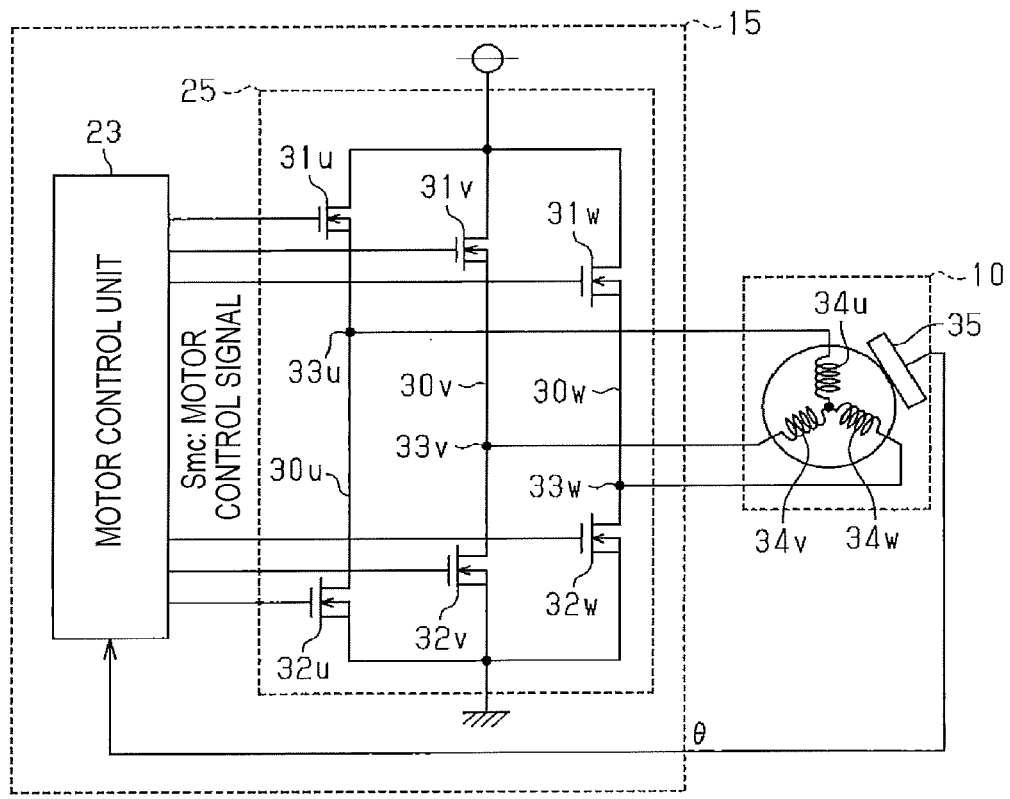
FIG. 2 is a view illustrating a schematic configuration of a door ECU, which serves as a motor control device.

More specifically, as illustrated in FIG. 2, the door ECU 15 of the present embodiment includes a motor control unit 23, which generates a motor control signal Smc for controlling the operation of the motor 10, and a drive circuit 25, which outputs driving power to the motor 10 based on the motor control signal Smc. That is, the door ECU 15 of the present embodiment controls the operation of the door actuator 11 through the supply of driving power to the motor 10. Thus, the door ECU 15 is configured to open/close the slide door 1 based on the operation request of the user.

Specifically, a well-known PWM inverter, which is constituted by connecting, in a bridge form, a plurality of switching elements (field effect transistors (FET)), which are turned on/off based on a motor control signal Smc, is used in the drive circuit 25 of the present embodiment. Then, the door ECU 15, which serves as a motor control device, controls the operation of the motor 10 by outputting three-phase (U, V, W) driving power via the drive circuit 25.

That is, the drive circuit 25 of the present embodiment includes three rows of switching arms 30u, 30v, and 30w corresponding to respective phases of the motor 10. In addition, each of the switching arms 30u, 30v, and 30w includes a pair of upper and lower FETs 31u and 32u, FETs 31v and 32v, or FETs 31w and 32w connected in series. Moreover, the drive circuit 25 has a configuration in which the switching arms 30u, 30v, and 30w are connected in parallel. Then, in the drive circuit 25 of the present embodiment, connection points 33u, 33v, and 33w between the FETs 31u and 32u, between the FETs 31v and 32v, and between the FETs 31w and 32w are connected to motor coils 34u, 34v, and 34w of the respective corresponding phases.

In addition, the motor control unit 23 generates the motor control signal Smc depending on a rotation angle (electrical angle) θ of the motor 10. Then, the door ECU 15 of the present embodiment rotates the motor 10 by sequentially switching the conduction phase of the motor 10 by the output of the motor control signal Smc.

Figure 3:
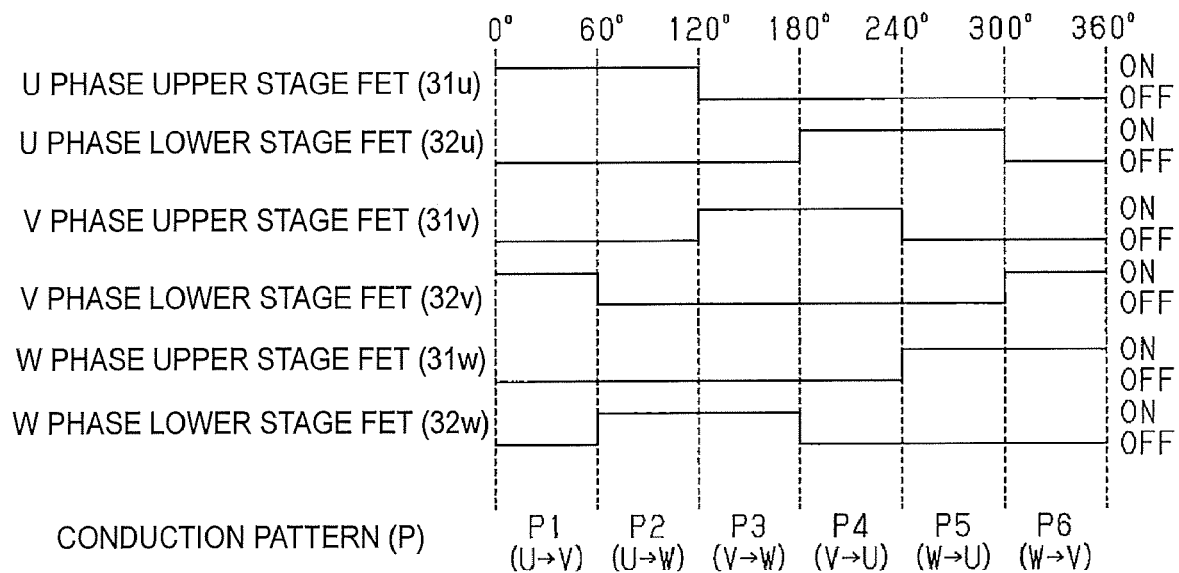
FIG. 3 is an explanatory view illustrating a mode of rotational driving control (rectangular wave conduction)

Specifically, as illustrated in FIG. 3, the motor control unit 23 of the present embodiment generates the motor control signal Smc so as to perform rectangular wave conduction (120° conduction) on the motor 10. That is, for example, when the rotation angle θ of the motor 10 in FIG. 2 is in the range from 0° to 60°, the motor control unit 23 generates a motor control signal Smc to turn on the U-phase upper stage FET 31u and the V-phase lower stage FET 32v of the drive circuit 25 (conduction pattern P1). In addition, when the rotation angle θ of the motor 10 is in the range from 60° to 120°, the motor control unit 23 generates a motor control signal Smc to turn on the U-phase upper stage FET 31u and the W-phase lower stage FET 32w (conduction pattern P2). Then, when the rotation angle θ of the motor 10 is in the range from 120° to 180°, the motor control unit 23 generates a motor control signal Smc to turn on the V-phase upper stage FET 31v and the W-phase lower stage FET 32w of the drive circuit 25 (conduction pattern P3).

In addition, when the rotation angle θ of the motor 10 is in the range from 180° to 240°, the motor control unit 23 generates a motor control signal Smc to turn on the V-phase upper stage FET 31v and the U-phase lower stage FET 32u (conduction pattern P4). Moreover, when the rotation angle θ of the motor 10 is in a range from 240° to 300°, the motor control unit 23 generates a motor control signal Smc to turn on the W-phase upper stage FET 31w and the U-phase lower stage FET 32u of the drive circuit 25 (conduction pattern P5). Then, when the rotation angle θ of the motor 10 is in the range from 300° to 360°, the motor control unit 23 generates a motor control signal Smc to turn on the W-phase upper stage FET 31w and the V-phase lower stage FET 32v (conduction pattern P6).

Figure 4:
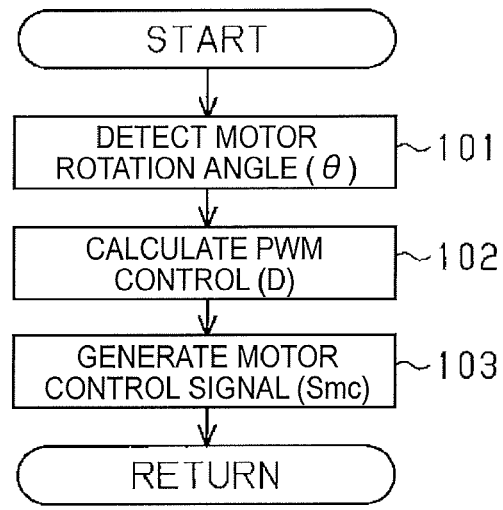
FIG. 4 is a flowchart illustrating a processing procedure when generating a motor control signal.

More specifically, as illustrated in the flowchart of FIG. 4, the motor control unit 23 of the present embodiment detects the rotation angle θ of the motor 10 based on an output signal of a rotation angle sensor 35 (step 101). In addition, the motor control unit 23 determines a duty ratio (ON duty ratio) D depending on the control state of the motor 10 by executing PWM control calculation (step 102). Then, based on the detected rotation angle θ of the motor 10 and the duty ratio D depending on the control state, the motor control unit 23 generates a motor control signal Smc to be output to the drive circuit 25 (step 103).

That is, the motor control signal Smc output by the motor control unit 23 is a PWM control signal, which defines the combination of the upper stage FET and the lower stage FET of the conduction phase corresponding to each conduction pattern P (P1 to P6) depending on the rotation angle θ of the motor 10 (see FIG. 2) and the ON/OFF timing corresponding to the set duty ratio D. In addition, in the drive circuit 25 of the present embodiment, based on the motor control signal Smc, the upper stage FET corresponding to the conduction phase remains in the ON state and the lower stage FET corresponding to the conduction phase is turned on/off by PWM control. Thus, the door ECU 15 of the present embodiment is configured to adjust driving power to be supplied to the motor 10.

(Braking Control when Performing Intermediate Stop of Slide Door)

Next, a mode of braking control executed by the door ECU 15 of the present embodiment when intermediate stop of the slide door 1 is performed during the opening/closing driving will be described.

Figure 5:
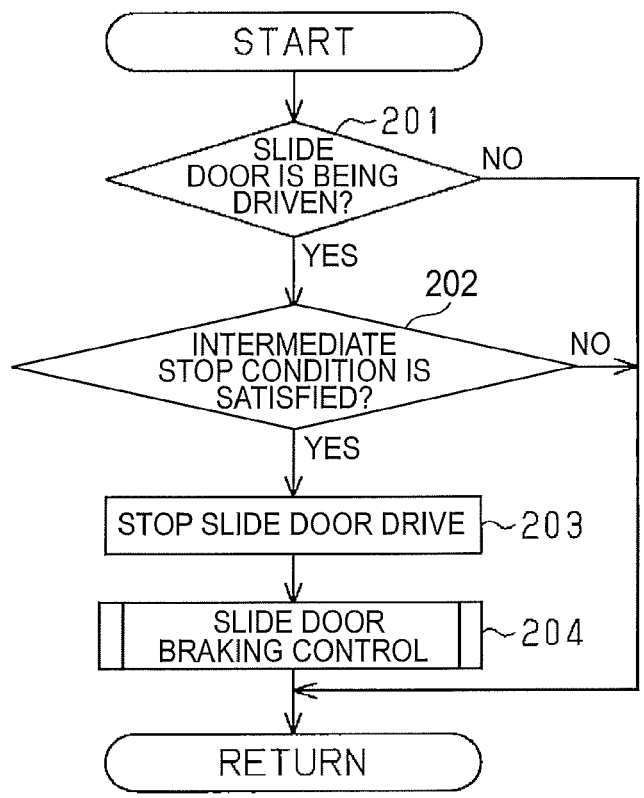
FIG. 5 is a flowchart illustrating a processing procedure when performing intermediate stop of a slide door during opening/closing driving.

As illustrated in the flowchart of FIG. 5, during opening/closing driving of the slide door 1 (step 201: YES), when an intermediate stop condition is satisfied, for example, when the door handle 3 is operated or when abnormality occurs (step 202: YES), the door ECU 15 of the present embodiment stops the opening/closing driving of the slide door 1 (step 203). In this case, the door ECU 15 is configured to apply a braking force to the slide door 1 by controlling the operation of the motor 10, which is a drive source of the door actuator 11 (braking control, step 204).

Figure 6:
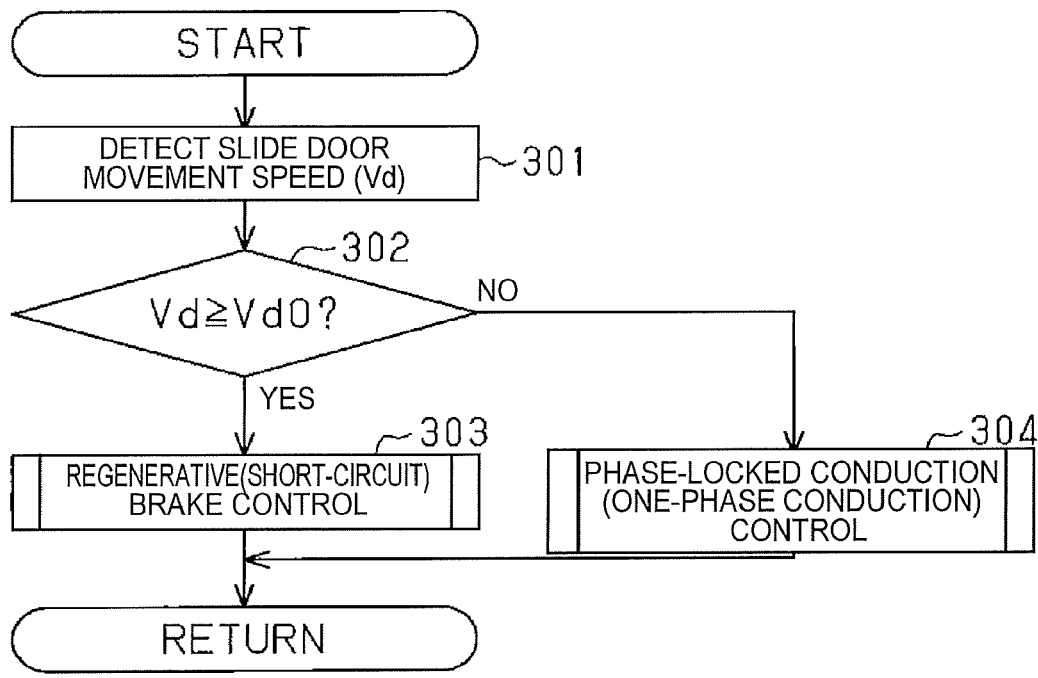
FIG. 6 is a flowchart illustrating a mode of braking control executed at the time of intermediate stop of the slide door.

Specifically, as illustrated in the flowchart of FIG. 6, the door ECU 15 of the present embodiment detects the movement speed Vd of the slide door 1 during the braking control in the case of performing the intermediate stop of the slide door 1 (step 301). In addition, the door ECU 15 determines whether or not the movement speed Vd of the slide door 1 is equal to or higher than a predetermined speed Vd0 (step 302). Then, when the movement speed Vd is equal to or higher than the predetermined speed Vd0 (Vth≥Vd0, step 302: YES), the door ECU 15 applies the braking force to the slide door 1 by turning "ON" all of the respective phase lower stage FETs 32u, 32v and 32w constituting the drive circuit 25, that is, by executing regenerative brake control (short brake control), which short-circuits each phase terminal of the motor 10 (step 303).

In addition, when the movement speed Vd of the slide door 1 is lower than the predetermined speed Vd0 (step 302: NO), the door ECU 15 of the present embodiment supplies driving power having a locked conduction phase to the motor 10, which is a drive source of the slide door 1, that is, the ECU executes phase-locked conduction control (one-phase conduction control) (step 304). That is, the conduction phase of the motor 10 to which driving power is output from the drive circuit 25, that is, the conduction pattern P (P1 to P6) is defined by the combination of a high potential side conduction phase corresponding to any one of the respective phase upper stage FETs 31u, 31v, and 31w constituting the drive circuit 25 and a low potential side conduction phase corresponding to any one of the respective phase lower stage FETs 31u, 31v, and 31w (see FIG. 3). Then, by locking one of these conduction patterns P (P1 to P6) to the conduction phase, that is, by not performing switching depending on the rotation angle θ as in rotational driving, it is possible to apply the braking force to the slide door 1 even in a state where rotation of the motor 10 is stopped.

In this way, the door ECU 15 of the present embodiment switches a mode of braking control depending on the movement speed Vd of the slide door 1. Thus, the power slide door apparatus 20 of the present embodiment is configured to smoothly decelerate the moving slide door 1 and to maintain the opening/closing operation position Xd of the stopped slide door 1.

Figure 7:
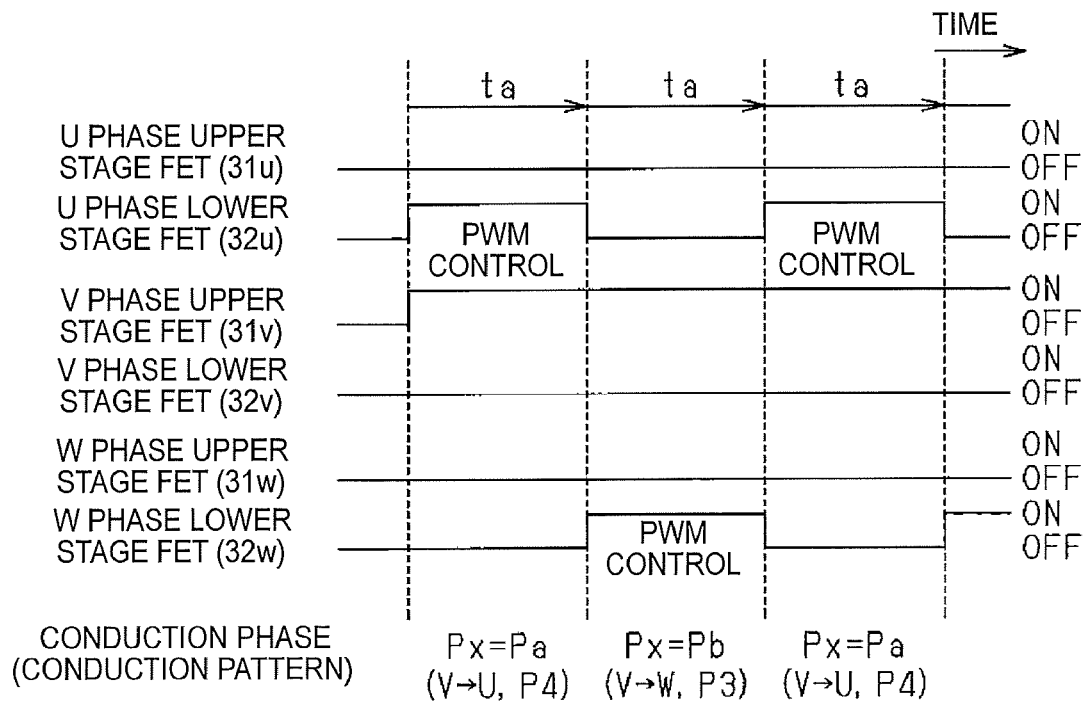
FIG. 7 is an explanatory view illustrating a mode of phase-locked conduction control and switching control of conduction phases used for the phase-locked conduction control.

In addition, as illustrated in FIG. 7, the door ECU 15 of the present embodiment periodically switches a conduction phase Px used for phase-locked conduction control when executing the phase-locked conduction control described above (see FIG. 6, step 304). Specifically, the door ECU 15 executes the phase-locked conduction control by executing PWM control while turning on/off any one of the respective phase lower stage FETs 32u, 32v and 32w constituting the drive circuit 25, which corresponds to the conduction phase Px, at a predetermined duty ratio D (see FIG. 4, step 102). Moreover, the door ECU 15 selects first and second locked conduction phases Pa and Pb in advance as the conduction phase Px used for the phase-locked conduction control. In addition, the door ECU 15 of the present embodiment executes the phase-locked conduction control while switching the first and second locked conduction phases Pa and Pb whenever a predetermined time ta elapses.

For example, in an example illustrated in FIG. 7, the door ECU 15 first executes phase-locked conduction control in a first locked conduction phase Pa in which a high potential side conduction phase is a "V phase" and a low potential side conduction phase is an "U phase" (see FIG. 3, V→U conduction, conduction pattern P4). In addition, after a predetermined time ta passes, the door ECU 15 executes phase-locked conduction control in a second locked conduction phase Pb in which a high potential side conduction phase is a "V phase" and a low potential side conduction phase is a "W phase" (see FIG. 3, V→W conduction, conduction pattern P3). In addition, after the predetermined time ta passes after the switching of the conduction phase Px used for the phase-locked conduction control, the door ECU 15 again executes phase-locked conduction control in the first locked conduction phase Pa. Further, the door ECU 15 of the present embodiment executes phase-locked conduction control while switching the first and second locked conduction phases Pa and Pb at every predetermined time ta until a preset conduction termination condition is satisfied.

Figure 8:
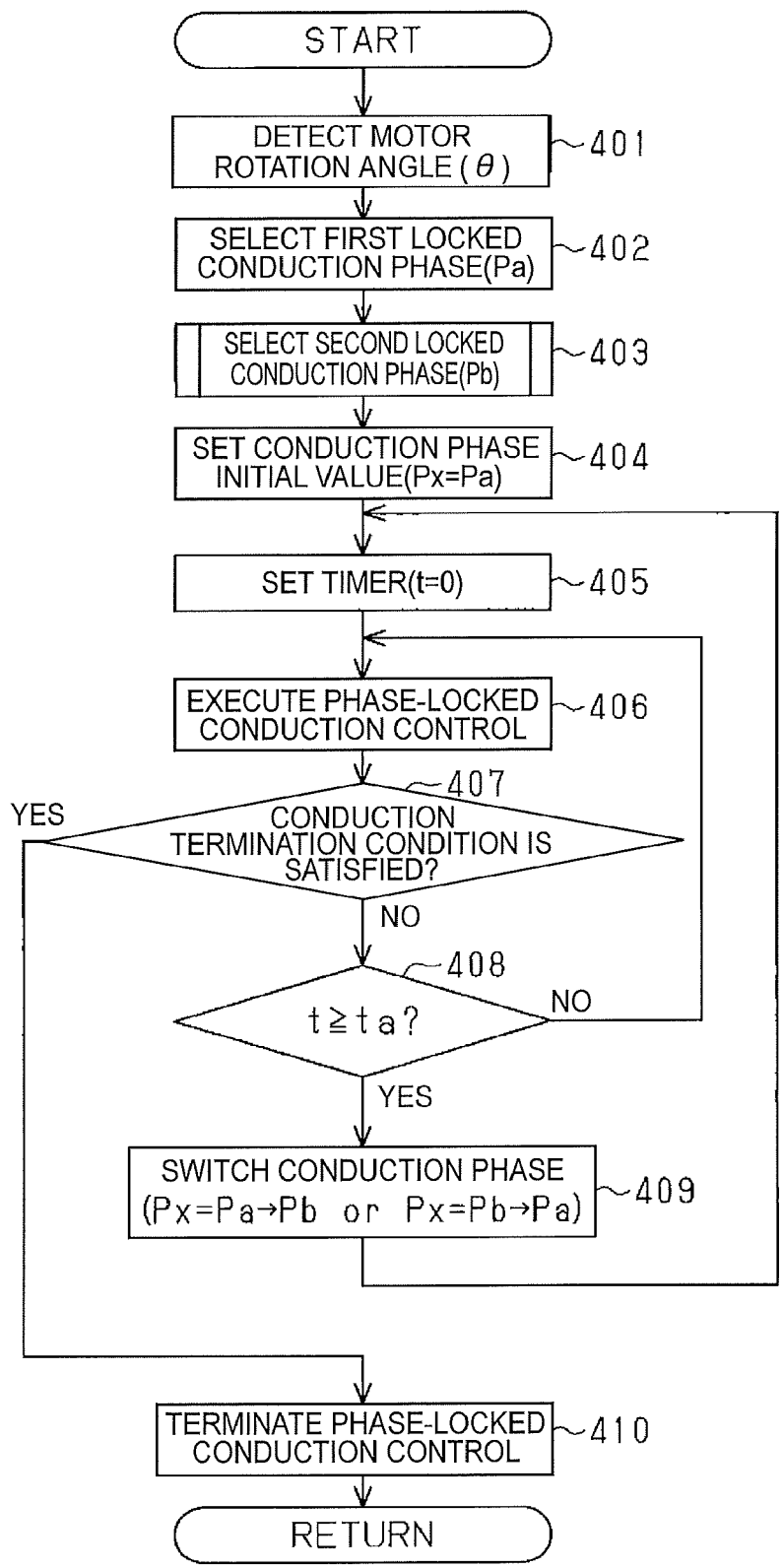
FIG. 8 is a flowchart illustrating a processing procedure of phase-locked conduction control and switching control of conduction phases used for the phase-locked conduction control.

Specifically, as illustrated in the flowchart of FIG. 8, the door ECU 15 of the present embodiment first detects the rotation angle θ of the motor 10 (step 401), thereby selecting the first locked conduction phase Pa (step 402). That is, a conduction phase (conduction pattern P) depending on the rotation angle θ at a detection time as in the rotational driving of the motor 10 is selected as the first locked conduction phase Pa (see FIG. 3). Then, the door ECU 15 of the present embodiment selects a conduction phase, which is equal to the first locked conduction phase Pa in terms of the high potential side conduction phase, as the second locked conduction phase Pb (step 403).

Figure 9:
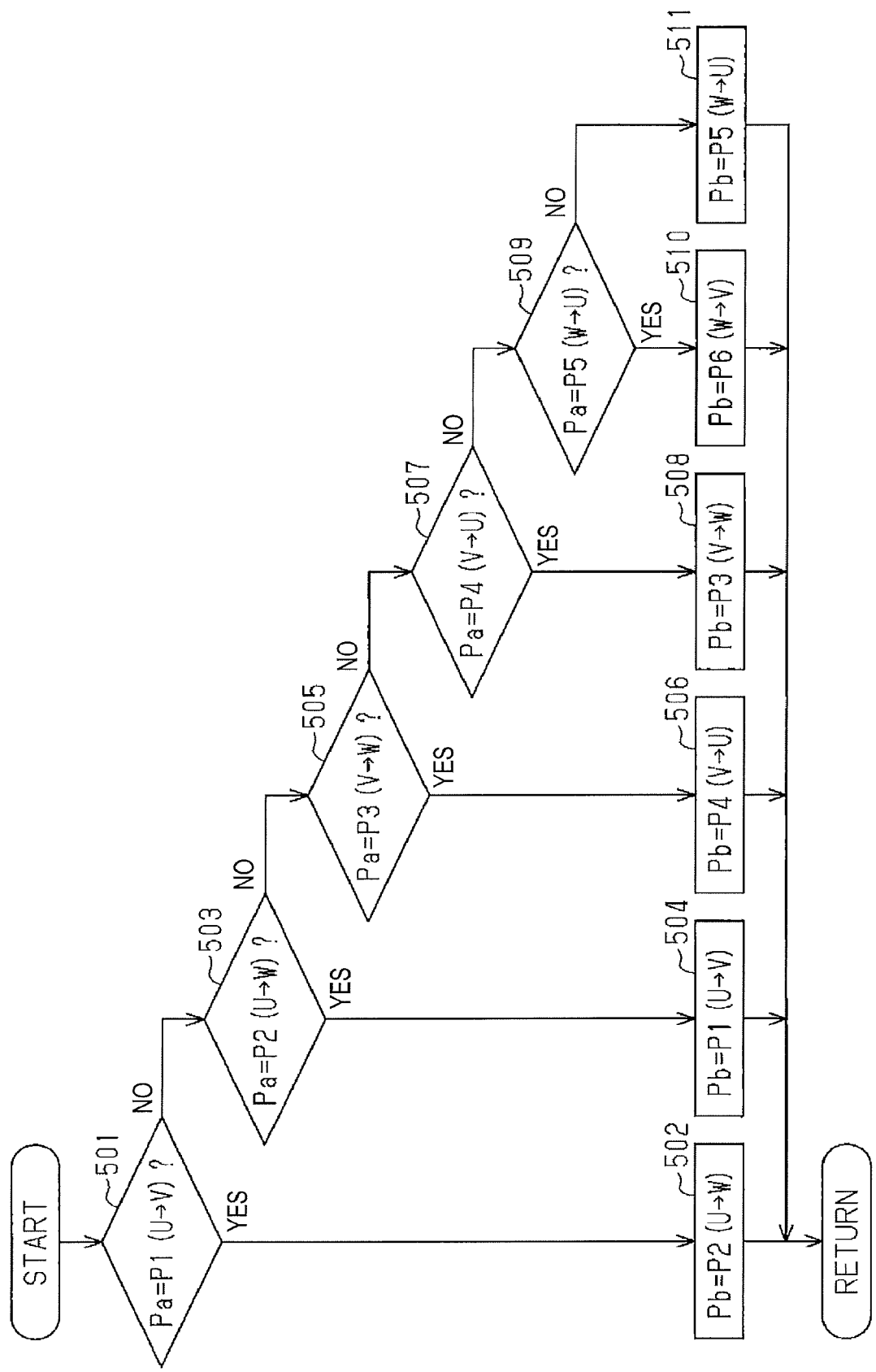
FIG. 9 is a flowchart illustrating a processing procedure when selecting a second locked conduction phase.

Specifically, as illustrated in the flowchart of FIG. 9, when selecting the conduction pattern P1 (U→V conduction) in FIG. 3 as the first locked conduction phase Pa (step 501: YES), the door ECU 15 of the present embodiment selects the conduction pattern P2 (U→W conduction), which is equal to the conduction pattern P1 in terms of the high potential side conduction phase, as the second locked conduction phase Pb (step 502). In addition, when selecting the conduction pattern P2 (U→W conduction) as the first locked conduction phase Pa (step 503: YES), the door ECU 15 selects the conduction pattern P1 (U→V conduction), which is equal to the conduction pattern P2 in terms of the high potential side conduction phase, as the second locked conduction phase Pb (step 504).

In addition, when selecting the conduction pattern P3 (V→W conduction) as the first locked conduction phase Pa (step 505: YES), the door ECU 15 selects the conduction pattern P4 (V→U conduction), which is equal to the conduction pattern P3 in terms of the high potential side conduction phase, as the second locked conduction phase Pb (step 506). Then, when selecting the conduction pattern P4 (V→U conduction) as the first locked conduction phase Pa (step 507: YES), the door ECU 15 selects the conduction pattern P3 (V→W conduction), which is equal to the conduction pattern P4 in terms of the high potential side conduction phase, as the second locked conduction phase Pb (step 508).

In addition, when selecting the conduction pattern P5 (W→U conduction) as the first locked conduction phase Pa (step 509: YES), the door ECU 15 selects the conduction pattern P6 (W→V conduction), which is equal to the conduction pattern P5 in terms of the high potential side conduction phase, as the second locked conduction phase Pb (step 510). In addition, when selecting the conduction pattern P6 (W→V conduction) as the first locked conduction phase Pa (step 509: NO), the door ECU 15 selects the conduction pattern P5 (W→U conduction), which is equal to the conduction pattern P6 in terms of the high potential side conduction phase, as the second locked conduction phase Pb (step 511).

As illustrated in FIG. 8, when the first and second locked conduction phases Pa and Pb are selected as described above, the door ECU 15 of the present embodiment first sets an initial value of the conduction phase Px used for phase-locked conduction control to the first locked conduction phase Pa (Px=Pa, step 404). Then, the door ECU 15 sets a timekeeping timer (t=0, step 405), and executes phase-locked conduction control (step 406).

In addition, the door ECU 15 of the present embodiment determines whether or not a preset conduction termination condition is satisfied (step 407), and determines whether or not the execution time t of the phase-locked conduction control reaches or exceeds a predetermined time ta (step 408). In addition, when the conduction termination condition is not satisfied (step 407: NO) and the execution time t of the phase-locked conduction control has not reached the predetermined time ta (t<ta, step 408: NO), processings of steps 406 to 408 are repeatedly executed.

Next, when it is determined in step 408 that the execution time t of the phase-locked conduction control reaches or exceeds the predetermined time ta (t≥ta, step 408: YES), the door ECU 15 of the present embodiment switches the conduction phase used for the phase-locked conduction control (step 409). That is, when the phase-locked conduction control has been executed in the first locked conduction phase Pa, the door ECU 15 switches the conduction phase Px used for the phase-locked conduction control to the second locked conduction phase Pb (Px=Pa→Pb), and when the phase-locked conduction control has been executed in the second locked conduction phase Pb, the door ECU 15 switches the conduction phase Px used for the phase-locked conduction control to the first locked conduction phase Pa (Px=Pb→Pa). In addition, the door ECU 15 of the present embodiment again sets the timekeeping timer in step 405 (t=0, step 405), and then executes respective processings after step 406.

That is, unless a predetermined conduction termination condition is satisfied, the door ECU 15 of the present embodiment repeats the respective processings of steps 406 to 408 until it is determined that the execution time t of the phase-locked conduction control reaches or exceeds the predetermined time ta. Thus, the door ECU 15 executes phase-locked conduction control in the new conduction phase Px switched in step 409.

Moreover, when the execution time t of the phase-locked conduction control reaches or exceeds the predetermined time ta, the door ECU 15 again switches the conduction phase Px to execute the phase-locked conduction control thereof. Then, when the conduction termination condition is satisfied in step 407 (step 407: YES), the door ECU 15 terminates the phase-locked conduction control (step 410).

(Slide Door Stop Determination)

Next, stop determination of the slide door 1 executed by the door ECU 15 of the present embodiment will be described.

Figures 10, 11:
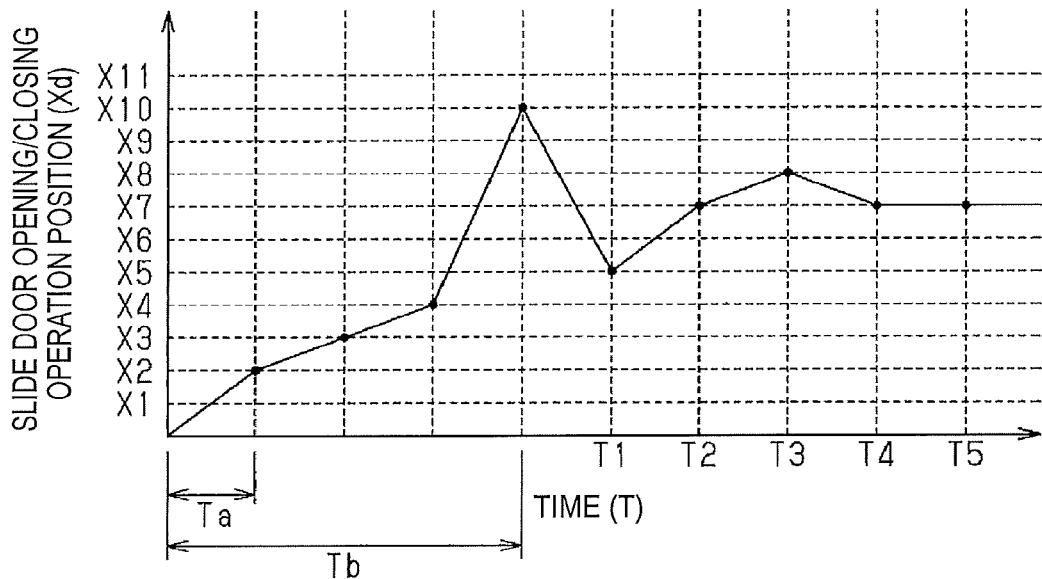
FIG. 10 is an explanatory view of slide door stop determination.
FIG. 11 is an explanatory view of slide door stop determination.

As illustrated in FIGS. 10 and 11, the door ECU 15 of the present embodiment detects the opening/closing operation position Xd of the slide door 1 in a predetermined detection period Ta by counting pulse signals Sp synchronized with rotation of the motor 10. Then, as illustrated in FIG. 11, the door ECU 15 of the present embodiment holds the opening/closing operation position Xd detected at each detection period over a plurality of detection periods (four periods in the present embodiment) in a storage area 40 (hold values Xd1 to Xd4).

In addition, as illustrated in FIGS. 10 and 11, the door ECU 15 of the present embodiment calculates a differential value (absolute value) between the hold value Xd4 obtained before a predetermined number of times (before 4 times in the present embodiment), among the hold values Xd1 to Xd4 of the opening/closing operation position Xd, and a detected value of the opening/closing operation position Xd in the current detection period. In addition, in the present embodiment, the opening/closing operation position Xd of the slide door 1 is indicated by the count number (cnt) of the pulse signals Sp. Then, the door ECU 15 of the present embodiment executes stop determination of the slide door 1 based on a change in opening/closing operation position at an interval of a predetermined time Tb indicated by the differential value |Xd−Xd4|.

Figure 12:
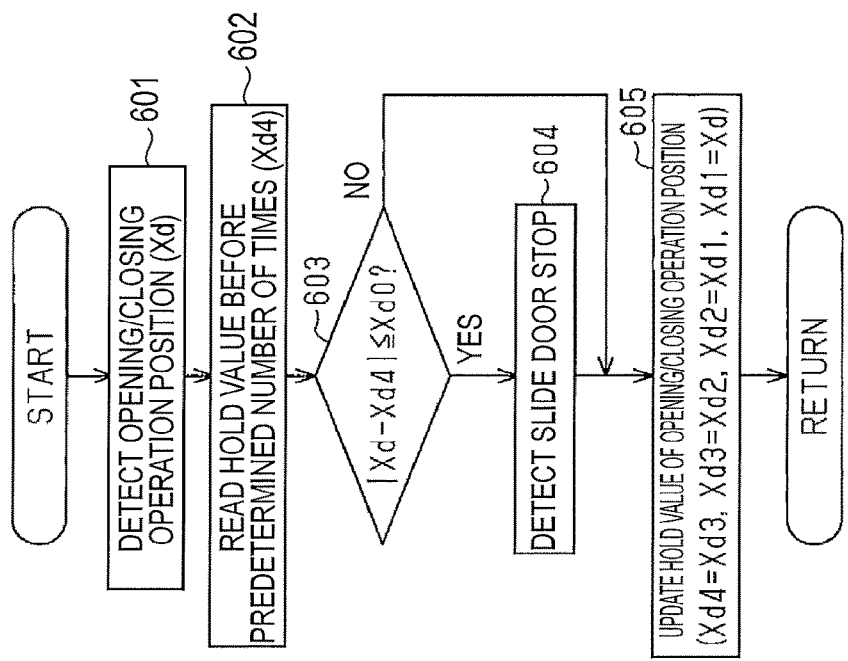
FIG. 12 is a flowchart illustrating a processing procedure of slide door stop determination.

Specifically, as illustrated in the flowchart of FIG. 12, when detecting the opening/closing operation position Xd of the slide door 1 (step 601), the door ECU 15 of the present embodiment subsequently reads the hold value Xd4 of the opening/closing operation position Xd in a detection period before a predetermined number of periods (before 4 periods) held in the storage area 40 (step 602). Moreover, the door ECU 15 determines whether or not the differential value |Xd−Xd4| is equal to or less than a predetermined threshold value Xd0 (step 603). In addition, in the power slide door apparatus 20 of the present embodiment, the threshold value Xd0 used for the stop determination of the slide door 1 is set to "2cnt", which is the count number of the pulse signals Sp. Then, when the differential value |Xd−Xd4| is equal to or less than the predetermined threshold value Xd0 (|Xd−Xd4|≤Xd0, step 603: YES), the door ECU 15 of the present embodiment determines that the slide door 1 is in a stop state (slide door stop detection, step 604).

In addition, after executing the stop determination processing of step 603, the door ECU 15 of the present embodiment updates, based on the opening/closing operation position Xd (detected value) in the current detection period detected in step 601, the respective hold values Xd1 to Xd4 of the opening/closing operation position Xd detected in the past (step 605). In addition, the updating processings of the respective hold values Xd1 to Xd4 in step 605 are performed by sequentially rewriting the value one time before (Xd4=Xd3, Xd3=Xd2, Xd2=Xd1, and Xd1=Xd). Thus, the door ECU 15 of the present embodiment is configured to avoid occurrence of erroneous detection caused by, for example, vibration of the slide door 1.

That is, for example, in the case of an example illustrated in FIGS. 10 and 11, the differential value |Xd−Xd4| between the hold value Xd4 before a predetermined number of times at time T1 and the detected value of the opening/closing operation position Xd in the current detection period is "3cnt". Thereafter, the value changes to "4cnt", "4cnt", and "3cnt" from time T2 to time T4. Then, the differential value |Xd−Xd4| becomes "2cnt" at time T5, whereby the stop state of the slide door 1 is detected.

Figure 13:
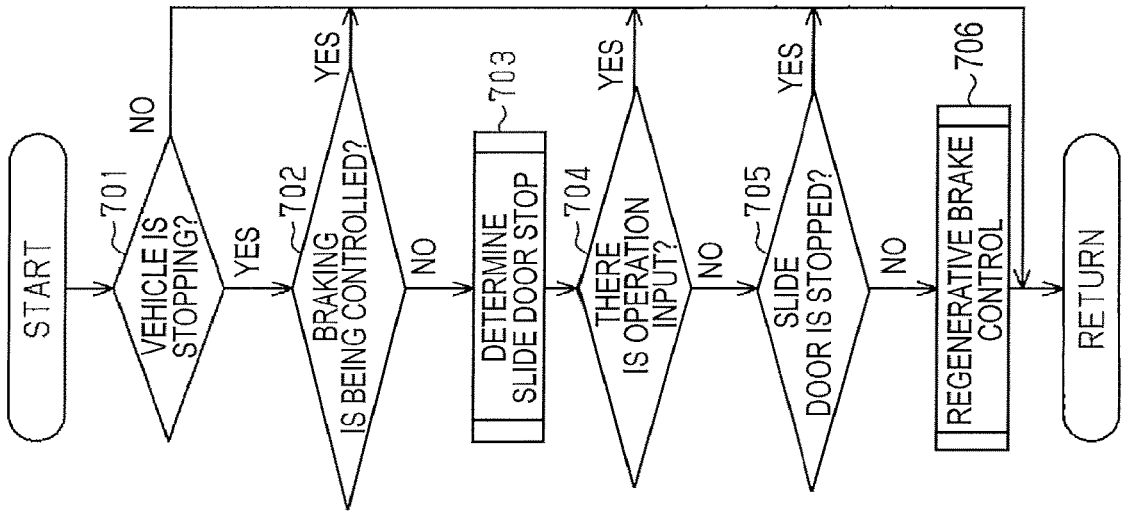
FIG. 13 is a flowchart illustrating a mode of slide door movement detection and braking control executed when movement is detected.

More specifically, as illustrated in the flowchart of FIG. 13, while the vehicle is stopping (step 701: YES) and braking control of the slide door 1 is not performed (step 702: NO), the door ECU 15 of the present embodiment executes the stop determination of the slide door 1 (step 703). Moreover, despite the absence of a user operation input (step 704: NO), in the stop determination of step 703, when it is determined that the slide door 1 is not in the stop state (step 705: NO), the door ECU 15 of the present embodiment executes regenerative brake control to short-circuit each phase terminal of the motor 10 (step 706). Thus, the power slide door apparatus 20 of the present embodiment applies a braking force to the slide door 1 so that, for example, even when the slide door 1 starts to move due to the inclination of the road surface, the slide door 1 slowly moves to a fully-closed position or a fully-opened position by the weight thereof.

(Braking Control when the Slide Door is in an Opening Operation State During the Traveling of the Vehicle)

Next, a mode of braking control executed by the door ECU 15 of the present embodiment when the slide door 1 is in an opening operation state during the traveling of the vehicle will be described.

Figure 14:
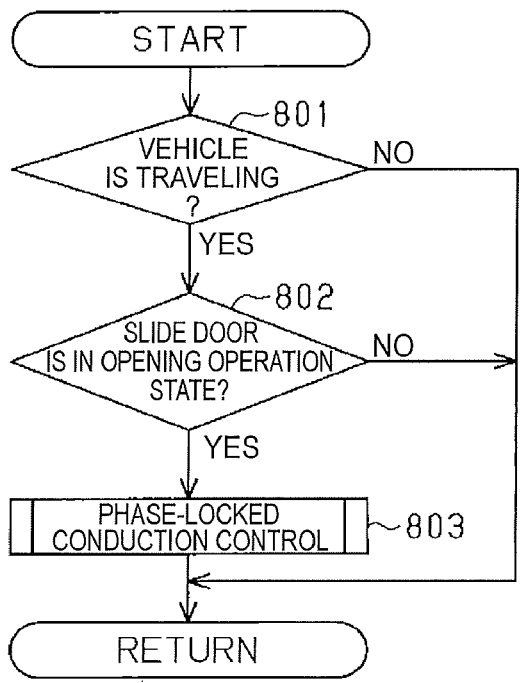
FIG. 14 is a flowchart illustrating a mode of braking control executed when a slide door is in an opening operation state during the traveling of a vehicle.

As illustrated in FIG. 14, when the vehicle is traveling (step 801: YES), the door ECU 15 of the present embodiment determines whether or not the slide door 1 is in an opening operation state (step 802). Moreover, when it is determined that the slide door 1 is in the opening operation state (step 802: YES), the door ECU 15 supplies driving power having a locked conduction phase to the motor 10, which is a drive source of the slide door 1, that is, executes phase-locked conduction control (step 803). Thus, the door ECU 15 of the present embodiment is configured to maintain the opening/closing operation position Xd of the slide door 1.

Figure 15:
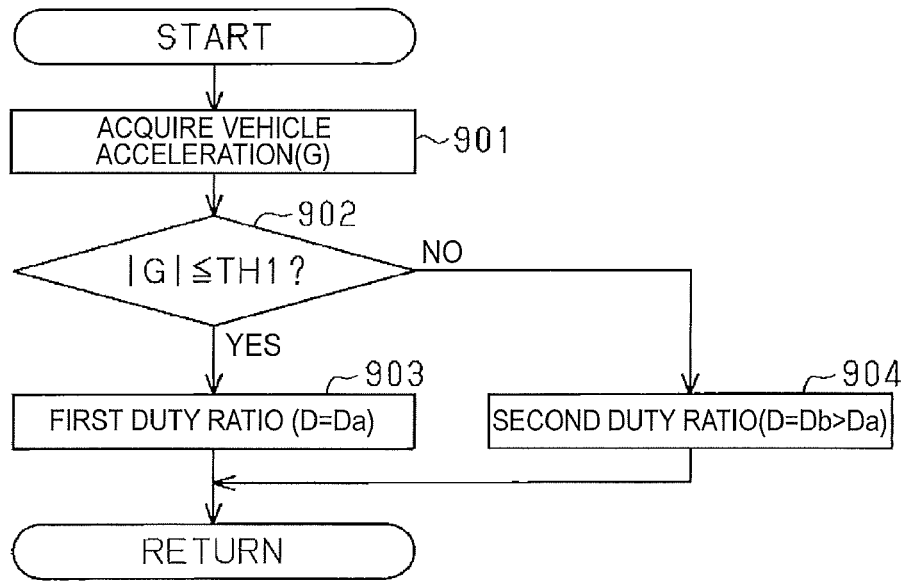
FIG. 15 is a flowchart illustrating a processing procedure of duty ratio variable control depending on the acceleration of the vehicle.

In addition, as illustrated in FIG. 15, when executing phase-locked conduction control for maintaining the opening/closing operation position Xd of the slide door 1 during the traveling of the vehicle, the door ECU 15 of the present embodiment detects the acceleration (longitudinal acceleration) G of the vehicle (step 901). In addition, the door ECU 15 of the present embodiment detects the acceleration G of the vehicle based on an output signal of an acceleration sensor 45 provided in the vehicle (see FIG. 1). Next, the door ECU 15 of the present embodiment compares the detected acceleration (absolute value) G of the vehicle with a predetermined switching threshold value TH1 (step 902). Then, the door ECU 15 of the present embodiment changes the duty ratio D (see FIG. 4, step 102) of PWM control for adjusting driving power to be supplied to the motor 10 based on the comparison result.

Specifically, when the detected acceleration G of the vehicle is equal to or less than the switching threshold value TH1 (|GK|≤TH1, step 902: YES), the door ECU 15 of the present embodiment sets the duty ratio D of PWM control to a first value Da (first duty ratio, D=Da, step 903). In addition, even in braking control while the vehicle is traveling, the door ECU 15 of the present embodiment also periodically switches the conduction phase Px used for phase-locked conduction control as described above (see FIGS. 7 and 8). Then, when the acceleration G of the vehicle exceeds the switching threshold value TH1 (|G|>TH1, step 902: NO), the duty ratio D of PWM control is set to a second value Db larger than the first value Da (second duty ratio, D=Db>Da, step 903).

Figure 16:
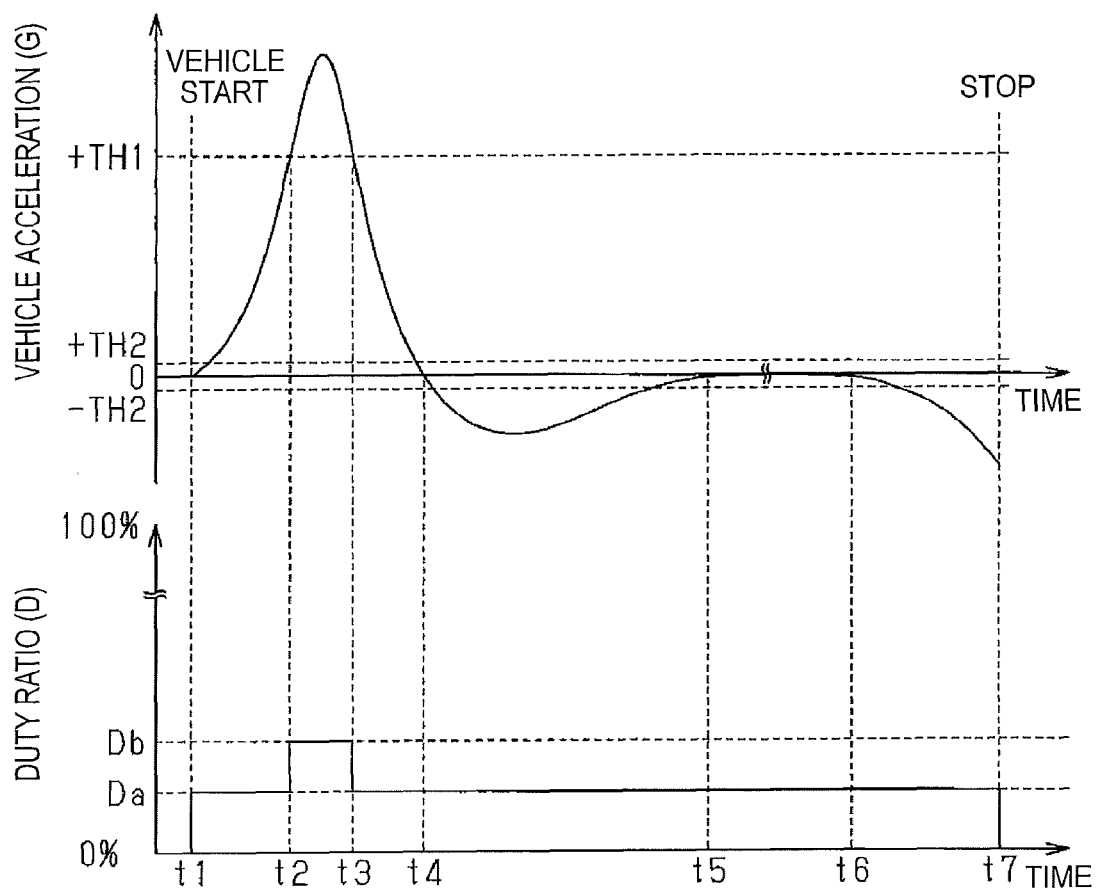
FIG. 16 is an explanatory view illustrating an example of a situation in which the duty ratio is changed depending on the acceleration of the vehicle.

That is, as illustrated in FIG. 16, for example, when the vehicle starts (time T1 to time T4), large acceleration G occurs in the longitudinal direction of the vehicle in which the opening/closing operation direction of the slide door 1 is set. Thus, a large force (inertia force) acts on the slide door 1 to move the slide door 1 in an opening/closing operation direction.

However, even in such a case, in the power slide door apparatus 20 of the present embodiment, when the acceleration G of the vehicle exceeds the switching threshold value TH1 (time T2 to time T3), larger driving power is supplied to the motor 10, which generates a braking force by executing the phase-locked conduction control (D=Db). Thus, the power slide door apparatus 20 of the present embodiment may stably maintain the opening/closing operation position Xd of the slide door 1 by increasing the braking force generated by the motor 10.

In addition, thereafter, when the acceleration G of the vehicle again falls below the switching threshold value TH1 (time T3 to time T7), the supply of driving power to the motor 10 is reduced (D=Da<Db). Thus, the power slide door apparatus 20 of the present embodiment may stably continue braking control by preventing heat generation during the braking control by phase-locked conduction control.

As described above, according to the present embodiment, the following effects can be obtained.

(1) The door ECU 15, which serves as a braking control unit 50, supplies driving power having a locked conduction phase to the motor 10, which is a drive source of the slide door 1 as an opening/closing body, thereby applying a braking force to the slide door 1 (see FIG. 8, step 406). Then, when the execution time t of phase-locked conduction control reaches or exceeds a predetermined time ta (t≥ta, step 408: YES), the door ECU 15 switches the conduction phase Px used for the phase-locked conduction control (step 409).

That is, by switching the conduction phase Px used for the phase-locked conduction control over the predetermined time ta, it is possible to disperse heat generation locations into a plurality of phases by executing the phase-locked conduction control. Thus, it is possible to prevent heat generation during braking control by phase-locked conduction. As a result, the braking control may be continued stably.

(2) The door ECU 15, which serves as the braking control unit 50, switches the conduction phase Px used for the phase-locked conduction control at every predetermined time ta.

That is, by adopting a configuration in which the conduction phase Px is periodically switched during the execution of the phase-locked conduction control, it is possible to shorten the predetermined time ta, which is a switching period of the conduction phase Px, and consequently, to shorten a continuous conduction time for one conduction phase Px. Thus, it is possible to more effectively prevent heat generation during braking control by phase-locked conduction. As a result, the braking control may be continued more stably.

(3) The door ECU 15, which serves as the braking control unit 50, selects the first locked conduction phase Pa depending on the rotation angle θ of the motor 10 (step 402). In addition, the door ECU 15 selects a conduction phase having the same high potential side conduction phase as the first locked conduction phase Pa as the second locked conduction phase Pb (step 403). In addition, the door ECU 15 switches the conduction phase Px used for the phase-locked conduction control between the first locked conduction phase Pa and the second locked conduction phase Pb (Px=Pa→Pb or Px=Pb→Pa).

According to the above configuration, it is possible to minimize a change in the rotation angle of the motor 10 caused by executing the phase-locked conduction control and switching the conduction phase Px. Thus, it is possible to more stably maintain the opening/closing operation position Xd of the slide door 1.

In particular, in the drive circuit 25 of the present embodiment, the upper stage FET corresponding to the conduction phase Px remains in the ON state, and the lower stage FET corresponding to the conduction phase Px is turned on/off by PWM control. Therefore, by switching the conduction phase Px between the first locked conduction phase Pa and the second locked conduction phase Pb, which have the same high potential side conduction phase as described above, in the drive circuit 25, the lower stage FET, which is turned on/off by PWM control, is switched. Thus, it is possible to more effectively prevent heat generation during braking control by phase-locked conduction.

(4) The door ECU 15, which serves as an opening/closing control unit 51, rotates the motor 10 to control an operation of the door actuator 11, thereby driving the slide door to perform opening/closing driving. In addition, when the opening/closing driving of the slide door 1 stops halfway (see FIG. 5, step 203), the door ECU 15, which serves as the braking control unit 50, controls an operation of the motor 10 to apply a braking force to the slide door 1 (step 204). Moreover, in braking control of the slide door 1, when the movement speed Vd of the slide door 1 is equal to or higher than a predetermined speed Vd0 (see FIG. 6, Vd≥Vd0, step 302: YES), the door ECU 15 applies a braking force to the slide door 1 by executing regenerative brake control (short brake control), which short-circuits each phase terminal of the motor 10 (step 303). Then, when the movement speed Vd of the slide door 1 is lower than the predetermined speed Vd0 (step 302: NO), the door ECU 15 applies a braking force to the slide door 1 by executing the phase-locked conduction control (step 304).

That is, by executing the regenerative brake control, it is possible to apply the braking force to the slide door 1 based on regenerative current generated in the motor 10 by the movement of the slide door 1. Thus, it is possible to smoothly decelerate the moving slide door 1. In addition, by executing the phase-locked conduction control, it is possible to apply the braking force to the slide door 1 even when the rotation of the motor 10 is stopped. Thus, it is possible to stably maintain the opening/closing operation position Xd of the stopped slide door 1.

(5) The door ECU 15, which serves as an opening/closing operation position detection unit 52a, detects the opening/closing operation position Xd of the slide door 1 by counting the pulse signals Sp synchronized with the rotation of the motor 10. In addition, the door ECU 15, which serves as an opening/closing operation position holding unit 52b, holds the opening/closing operation position Xd detected in each detection period over a plurality of detection periods in the storage area 40 (hold values Xd1 to Xd4). Then, the door ECU 15, which serves as a stop determination unit 52c, executes stop determination of the slide door 1 based on a differential value |Xd−Xd4| between the hold value Xd4 of the opening/closing operation position Xd detected in a detection period before a predetermined number of periods (before 4 periods) and a detected value of the opening/closing operation position Xd in the current detection period (see FIG. 12).

According to the above configuration, even when the resolution of the pulse signal Sp is high, it is possible to avoid occurrence of erroneous detection caused by, for example, vibration of the slide door 1. Thus, it is possible to accurately detect the stop state of the slide door 1.

(6) The door ECU 15, which serves as a PWM control unit 60a, adjusts driving power to be supplied to the motor 10 by executing PWM control. In addition, the door ECU 15, which serves as an acceleration detection unit 60b, detects the acceleration G of the vehicle. Moreover, when the acceleration G of the vehicle is equal to or less than a predetermined switching threshold value TH1 during the execution of phase-locked conduction control, the door ECU 15, which serves as the PWM control unit 60a, sets the duty ratio D of PWM control to a first value Da (|G|≤TH1, D=Da). Then, when the acceleration G of the vehicle exceeds the switching threshold value TH1, the door ECU 15 sets the duty ratio D of PWM control to a second value Db higher than the first value Da (|G|>TH1, D=Da>Db).

That is, a force (inertia force) acts on the slide door 1 to move the slide door 1 in an opening/closing operation direction when the vehicle accelerates (or decelerates), such as when the vehicle starts. However, according to the above configuration, when the acceleration G of the vehicle exceeds the switching threshold value TH1, larger driving power is supplied to the motor 10, which generates a braking force by executing the phase-locked conduction control. Thus, it is possible to stably maintain the opening/closing operation position Xd of the slide door 1 by increasing the braking force generated by the motor 10.

Moreover, when the acceleration G of the vehicle is equal to or lower than the switching threshold value TH1, driving power to be supplied to the motor 10 is suppressed to be low. That is, in a situation where the force, which acts on the slide door 1 to move the slide door 1 in the opening/closing operation direction, is small due to acceleration or deceleration of the vehicle, it is possible to prevent heat generation during braking control by phase-locked conduction. Thus, the braking control may be continued stably.

In addition, the above embodiment may be modified as follows.

In the above embodiment, this disclosure is embodied as the power slide door apparatus 20 which opens/closes the slide door 1 as an opening/closing body by motor driving. However, this disclosure is not limited thereto, and may be applied to a vehicular opening/closing body control device for an opening/closing body other than the slide door 1, as long as the vehicular opening/closing control apparatus applies a braking force by executing phase-locked conduction control.

In the above embodiment, the door ECU 15 switches the conduction phase Px used for phase-locked conduction control at every predetermined time ta, but the number of switching times may not be necessarily periodic, and for example, may be one.

In the above embodiment, the door ECU 15 alternately switches the first and second locked conduction phases Pa and Pb, which are selected in advance before starting phase-locked conduction control, at every predetermined time ta. Then, the door ECU 15 selects the first locked conduction phase Pa according to the rotation angle $\theta$ of the motor 10. However, this disclosure is not limited thereto, and regardless of the rotation angle $\theta$ of the motor 10, the selected first and second locked conduction phases Pa and Pb may be determined in advance.

In addition, in the above embodiment, a conduction phase, which is equal to the first locked conduction phase Pa in terms of the high potential side conduction phase, is selected as the second locked conduction phase Pb, but a conduction phase, which is equal to the first locked conduction phase Pa in terms of the low potential conduction phase, may be selected as the second locked conduction phase Pb. Even with such a configuration, it is possible to minimize a change in the rotation angle of the motor 10 caused by switching the conduction phase Px.

In particular, by adopting a configuration in which the lower stage FET corresponding to the conduction phase Px remains in the ON state and the upper stage FET corresponding to the conduction phase Px is turned on/off by PWM control, the upper stage FET, which is turned on/off by PWM control, is switched. Thus, it is possible to more effectively prevent heat generation during braking control by phase-locked conduction as in the above embodiment.

Moreover, a switching candidate of the conduction phase Px may be determined during the execution of phase-locked conduction control. Then, a method of determining the switching candidate may also be arbitrarily changed, for example, by random selection.

In the above embodiment, the motor 10 is driven to rotate by rectangular wave conduction (120° conduction), but the rotational driving method of the motor 10 may be, for example, sine wave conduction (180° conduction).

In the above embodiment, the door ECU 15 holds the opening/closing operation position Xd detected in each detection period over four detection periods in the storage area 40 in the stop determination of the slide door 1 (hold values Xd1 to Xd4). Then, a differential value (absolute value) between the oldest hold value Xd4 before four times and a detected value of the opening/closing operation position Xd in the current detection period is calculated. However, this disclosure is not limited thereto, and the record of the opening/closing operation position Xd used for the calculation of the differential value may be arbitrarily set to the hold value before any number of times. Then, the number of detection periods held in the storage area 40 may also be arbitrarily changed.

In the above-described embodiment, the acceleration G of the vehicle is detected based on the output signal of the acceleration sensor 45, but may be calculated from a change in the vehicle speed V.

In the above embodiment, by comparing the acceleration G of the vehicle with a predetermined switching threshold value TH1, the duty ratio D of PWM control for adjusting driving power to be supplied to the motor 10 is changed in two stages. However, this disclosure is not limited thereto, and the duty ratio D of PWM control may be increased in multiple stages depending on the acceleration G of the vehicle by using a plurality of threshold values. Then, the duty ratio D of PWM control may be continuously and steplessly increased as the acceleration G of the vehicle increases by, for example, using map calculation.

Figure 17:
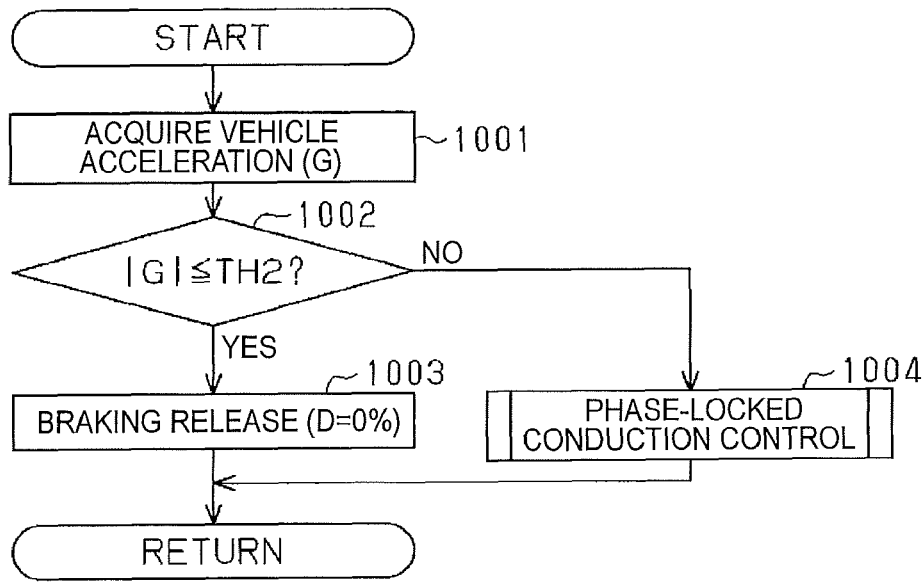
FIG. 17 is a flowchart illustrating a processing procedure of another example of the duty ratio variable control depending on the acceleration of the vehicle.

In addition, as illustrated in the flowcharts of FIGS. 16 and 17, the detected acceleration G of the vehicle is compared with a predetermined release threshold value TH2, which is set to a value lower than the switching threshold value TH1 (step 1002). Then, when the acceleration G of the vehicle is equal to or less than the release threshold TH2 (step 1002: YES), the duty ratio D of PWM control is set to "0%", and consequently, phase-locked conduction control may not be executed (brake release, step 1003).

That is, when the vehicle is in a steady traveling state (time t5 to time t6 in FIG. 16), the acceleration G of the vehicle becomes a small value. That is, in such a case, it is considered that the slide door 1 hardly moves even if the application of braking force by executing the phase-locked conduction control is released. Therefore, according to the above configuration, it is possible to more effectively prevent heat generation during braking control by phase-locked conduction while preventing displacement of the slide door 1.

In addition, as described above, in the case of adopting a configuration in which the duty ratio D of PWM control is changed according to the acceleration G of the vehicle during the execution of phase-locked conduction control, including a configuration in which the braking force applied to the slide door 1 is released while the vehicle is traveling, a configuration, which applies the braking force to the slide door 1 by, for example, movement of the slide door 1 as a trigger, may also be used. Thus, higher safety may be secured.

In addition, the switching threshold value TH1 may be set to two different values in the change direction (the increasing direction and the decreasing direction) of the acceleration G so as to have hysteresis in the switching characteristic of the duty ratio D. Similarly, the release threshold value TH2 may be set to two different values in the change direction of the acceleration G.

In the above embodiment, in phase-locked conduction control in a case where the slide door 1 is in the opening operation state during the traveling of the vehicle, a configuration in which the duty ratio D of PWM control is changed according to the acceleration G of the vehicle and a configuration in which the conduction phase Px used for the phase-locked conduction control is switched over the predetermined time ta are used together. However, this disclosure is not limited thereto, and when executing the variable control of the duty ratio D, the switching control of the conduction phase Px used for the phase-locked conduction control may not be performed.

Next, technical ideas that may be grasped from the above embodiment will be described together with effects.

(A) In the vehicular opening/closing body control device, the braking control unit selects a first locked conduction phase depending on a rotation angle of the motor. Thus, it is possible to minimize a change in the rotation angle of the motor caused by executing phase-locked conduction control.

(B) The vehicular opening/closing body control device includes a PWM control unit, which performs PWM control on either one of a high potential side switching element and a low potential side switching element of the drive circuit, which generates driving power, and the braking control unit selects the first and second locked conduction phases so that the PWM-controlled switching elements are switched. Thus, it is possible to more effectively prevent heat generation during braking control by phase-locked conduction.

(C) A vehicular opening/closing body control device includes an opening/closing operation position detection unit configured to detect an opening/closing operation position of an opening/closing body by counting pulse signals synchronized with rotation of a motor, which is a drive source of the opening/closing body, an opening/closing operation position holding unit configured to hold the opening/closing operation position detected at each detection period over a plurality of detection periods, and a stop determination unit configured to determine stop of the opening/closing body based on a differential value between a hold value of the opening/closing operation position detected in the detection period before a predetermined number of times and a detected value of the opening/closing operation position in the current detection period.

According to the above configuration, even when the resolution of the pulse signal is high, it is possible to avoid occurrence of erroneous detection caused by, for example, vibration of the opening/closing body. Thus, it is possible to accurately detect the stop state of the opening/closing body.

(D) A vehicular opening/closing body control device includes a PWM control unit configured to adjust driving power supplied to a motor by executing PWM control, and an acceleration detection unit configured to detect acceleration of a vehicle. The PWM control unit increases a duty ratio of the PWM control according to the acceleration of the vehicle when executing phase-locked conduction control for locking a conduction phase and supplying the driving power.

According to the above configuration, when the vehicle accelerates or decelerates, larger driving power is supplied to the motor, which generates a braking force by executing the phase-locked conduction control, as a force for opening/closing the opening/closing body increases. In addition, as the force for opening/closing the opening/closing body decreases, the driving power supplied to the motor decreases. Thus, it is possible to prevent heat generation during braking control by phase-locked conduction while stably maintaining the opening/closing operation position of the opening/closing body while the vehicle is traveling.

(E) The PWM control unit sets the duty ratio of the PWM control to a first value when the acceleration of the vehicle is equal to or less than a switching threshold value during the execution of the phase-locked conduction control, and sets the duty ratio of the PWM control to a second value higher than the first value when the acceleration of the vehicle exceeds the switching threshold value.

According to the above configuration, when the acceleration of the vehicle exceeds the predetermined switching threshold value, larger driving power is supplied to the motor, which generates the braking force by executing the phase-locked conduction control. Thus, by increasing the braking force generated by the motor, even when a large force acts to open/close the opening/closing body by the acceleration or deceleration of the vehicle, it is possible to stably maintain the opening/closing operation position of the opening/closing body.

In addition, when the acceleration of the vehicle is small and the force for opening/closing the opening/closing body is small, the driving power supplied to the motor is suppressed to be low. Thus, it is possible to effectively prevent heat generation during braking control by phase-locked conduction.

(F) The braking control unit does not perform the phase-locked conduction control when the acceleration of the vehicle is equal to or less than a predetermined release threshold value, which is set to a value lower than the switching threshold value.

That is, for example, when the vehicle is in a steady traveling state, the acceleration of the vehicle is a small value. That is, in such a case, it is considered that the opening/closing body hardly moves even if the application of the braking force by executing the phase-locked conduction control is released. Therefore, according to the above configuration, it is possible to more effectively prevent heat generation during braking control by phase-locked conduction while suppressing displacement of the opening/closing body.

A vehicular opening/closing body control device according to an aspect of this disclosure includes a braking control unit configured to apply a braking force to an opening/closing body by supplying driving power having a locked conduction phase to a motor, which is a drive source of the opening/closing body. When an execution time of phase-locked conduction control for locking the conduction phase and supplying the driving power reaches or exceeds a predetermined time, the braking control unit switches a conduction phase used for the phase-locked conduction control.

That is, by switching the conduction phase used for the phase-locked conduction control over time, it is possible to disperse heat generation locations by executing the phase-locked conduction control into a plurality of phases. Thus, it is possible to prevent heat generation during braking control by phase-locked conduction. As a result, the braking control may be continued stably.

In the vehicular opening/closing body control device according to the aspect of this disclosure, it is preferable that the braking control unit switches the conduction phase used for the phase-locked conduction control at every predetermined time.

That is, by adopting a configuration in which the conduction phase is periodically switched during the execution of the phase-locked conduction control, it is possible to shorten the predetermined time, which is a switching period of the conduction phase, and consequently, to shorten a continuous conduction time for one conduction phase. Thus, it is possible to more effectively prevent heat generation during braking control by phase-locked conduction. As a result, the braking control may be continued more stably.

In the vehicular opening/closing body control device according to the aspect of this disclosure, it is preferable that the conduction phase of the motor to which the driving power is supplied is defined by a combination of a high potential side conduction phase and a low potential side conduction phase, and the braking control unit selects first and second locked conduction phases, which are equal to each other in terms of the high potential side conduction phase or the low potential side conduction phase to switch the conduction phase used for the phase-locked conduction control.

According to the above configuration, it is possible to minimize a change in the rotation angle of the motor caused by switching the conduction phase used for the phase-locked conduction control. Thus, it is possible to more stably maintain the opening/closing operation position of the opening/closing body.

It is preferable that the vehicular opening/closing body control device according to the aspect of this disclosure further includes an opening/closing control unit configured to perform opening/closing driving of the opening/closing body by rotating the motor. It is preferable that the brake control unit applies the braking force to the opening/closing body by executing regenerative brake control for short-circuiting each phase terminal of the motor when the opening/closing driving of the opening/closing body stops halfway, and executes the phase-locked conduction control when a movement speed of the opening/closing body is lower than a predetermined speed.

That is, by executing the regenerative brake control, it is possible to apply the braking force to the opening/closing body based on regenerative current generated in the motor by movement of the opening/closing body. Thus, it is possible to smoothly decelerate the moving opening/closing body. In addition, by executing the phase-locked conduction control, it is possible to apply the braking force to the opening/closing body even when the rotation of the motor is stopped. Thus, it is possible to stably maintain the opening/closing operation position of the stopped opening/closing body.

A motor control device according to another aspect of this disclosure includes a braking control unit configured to generate a braking force in a motor by supplying driving power having a locked conduction phase to the motor, wherein, when an execution time of the phase-locked conduction control for locking the conduction phase and supplying the driving power reaches or exceeds a predetermined time, the braking control unit switches a conduction phase used for the phase-locked conduction control.

According to this disclosure, it is possible to prevent heat generation during braking control.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicular opening/closing body control device comprising:
    a braking control unit configured to apply a braking force to an opening/closing body by supplying driving power having a locked conduction phase to a motor, which is a drive source of the opening/closing body; and
    an opening/closing control unit configured to perform opening/closing driving of the opening/closing body by rotating the motor,
    wherein, when an execution time of phase-locked conduction control for locking the conduction phase and supplying the driving power reaches or exceeds a predetermined time, the braking control unit switches a conduction phase used for the phase-locked conduction control, and
    wherein the braking control unit applies the braking force to the opening/closing body by executing regenerative brake control for short-circuiting each phase terminal of the motor when the opening/closing driving of the opening/closing body stops halfway, and executes the phase-locked conduction control when a movement speed of the opening/closing body is lower than a predetermined speed.

2. The vehicular opening/closing body control device according to claim 1,
    wherein the conduction phase of the motor to which the driving power is supplied is defined by a combination of a high potential side conduction phase and a low potential side conduction phase, and
    the braking control unit selects first and second locked conduction phases, which are equal to each other in terms of the high potential side conduction phase or the low potential side conduction phase to switch the conduction phase used for the phase-locked conduction control.

3. A vehicular opening/closing body control device comprising:
    a braking control unit configured to apply a braking force to an opening/closing body by supplying driving power having a locked conduction phase to a motor, which is a drive source of the opening/closing body; and
    an opening/closing control unit configured to perform opening/closing driving of the opening/closing body by rotating the motor,
    wherein, when an execution time of phase-locked conduction control for locking the conduction phase and supplying the driving power reaches or exceeds a predetermined time, the braking control unit switches a conduction phase used for the phase-locked conduction control,
    wherein the braking control unit switches the conduction phase used for the phase-locked conduction control at every predetermined time, and
    wherein the braking control unit applies the braking force to the opening/closing body by executing regenerative brake control for short-circuiting each phase terminal of the motor when the opening/closing driving of the opening/closing body stops halfway, and executes the phase-locked conduction control when a movement speed of the opening/closing body is lower than a predetermined speed.

4. A motor control device comprising:
    a braking control unit configured to generate a braking force in a motor by supplying driving power having a locked conduction phase to the motor; and
    an opening/closing control unit configured to perform opening/closing driving of an opening/closing body by rotating the motor,
    wherein, when an execution time of phase-locked conduction control for locking the conduction phase and supplying the driving power reaches or exceeds a predetermined time, the braking control unit switches a conduction phase used for the phase-locked conduction control, and
    wherein the braking control unit applies the braking force to the opening/closing body by executing regenerative brake control for short-circuiting each phase terminal of the motor when the opening/closing driving of the opening/closing body stops halfway, and executes the phase-locked conduction control when a movement speed of the opening/closing body is lower than a predetermined speed.

* * * * *